(12) United States Patent
Nakagawa

(10) Patent No.: US 8,810,527 B2
(45) Date of Patent: Aug. 19, 2014

(54) INFORMATION PROCESSING APPARATUS AND CONTROL METHOD THEREFOR

(75) Inventor: Koichi Nakagawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 179 days.

(21) Appl. No.: 12/973,674

(22) Filed: Dec. 20, 2010

(65) Prior Publication Data

US 2011/0157047 A1 Jun. 30, 2011

(30) Foreign Application Priority Data

Dec. 25, 2009 (JP) ................................. 2009-295436

(51) Int. Cl.
*G06F 3/041* (2006.01)

(52) U.S. Cl.
USPC ............. 345/173; 178/18.03; 178/18.06; 348/14.03

(58) Field of Classification Search
CPC .... G06F 3/0488; G06F 3/04883; G06F 3/044
USPC ............. 345/173–184; 178/18.01–20.04; 348/14.03; 399/185
See application file for complete search history.

(56) References Cited

U.S. PATENT DOCUMENTS

| | | | |
|---|---|---|---|
| 6,249,606 B1* | 6/2001 | Kiraly et al. | 382/195 |
| 6,587,587 B2* | 7/2003 | Altman et al. | 382/181 |
| 6,614,422 B1* | 9/2003 | Rafii et al. | 345/168 |
| 6,791,700 B2* | 9/2004 | Omura et al. | 356/620 |
| 7,084,859 B1* | 8/2006 | Pryor | 345/173 |
| 7,176,896 B1* | 2/2007 | Fahraeus et al. | 345/173 |
| 7,345,675 B1* | 3/2008 | Minakuchi et al. | 345/173 |
| 7,355,620 B2* | 4/2008 | Ikehata et al. | 348/14.03 |
| 7,519,223 B2* | 4/2009 | Dehlin et al. | 382/203 |
| 7,567,238 B2* | 7/2009 | Sugimoto et al. | 345/173 |
| 7,649,562 B2* | 1/2010 | Misawa et al. | 348/333.01 |
| 8,405,601 B1* | 3/2013 | Beale | 345/156 |
| 2001/0012001 A1* | 8/2001 | Rekimoto et al. | 345/173 |
| 2003/0122802 A1* | 7/2003 | Bryborn | 345/173 |
| 2004/0041798 A1* | 3/2004 | Kim | 345/179 |
| 2004/0125088 A1* | 7/2004 | Zimmerman et al. | 345/173 |
| 2004/0233179 A1* | 11/2004 | Lira | 345/181 |
| 2005/0057524 A1* | 3/2005 | Hill et al. | 345/173 |
| 2005/0066291 A1* | 3/2005 | Lewak | 715/810 |
| 2005/0104867 A1* | 5/2005 | Westerman et al. | 345/173 |
| 2007/0152979 A1* | 7/2007 | Jobs et al. | 345/173 |
| 2009/0298551 A1* | 12/2009 | Yamazaki et al. | 455/566 |

FOREIGN PATENT DOCUMENTS

| | | |
|---|---|---|
| JP | 63-174125 A | 7/1988 |
| JP | 06-187098 A | 7/1994 |
| JP | 2004-104594 A | 4/2004 |
| JP | 2005-044036 A | 2/2005 |
| JP | 2009-251817 A | 10/2009 |
| KR | 10-2009-0100934 A | 9/2009 |

* cited by examiner

*Primary Examiner* — Amare Mengistu
*Assistant Examiner* — Vinh Lam
(74) *Attorney, Agent, or Firm* — Canon U.S.A., Inc. IP Division

(57) ABSTRACT

An information processing apparatus acquires a plurality of touching positions on a locus of touching operations, determines an operation direction of an operation by using a determination condition set based on the plurality of acquired touching positions, and performs an action predetermined in association with the determined operation direction. In addition, the information processing apparatus stores the determined operation direction on a memory and changes the determination condition based on the operation direction stored on the memory to determine an operation direction of a touching operation executed after the operation for which the operation direction has been determined and stored.

17 Claims, 9 Drawing Sheets

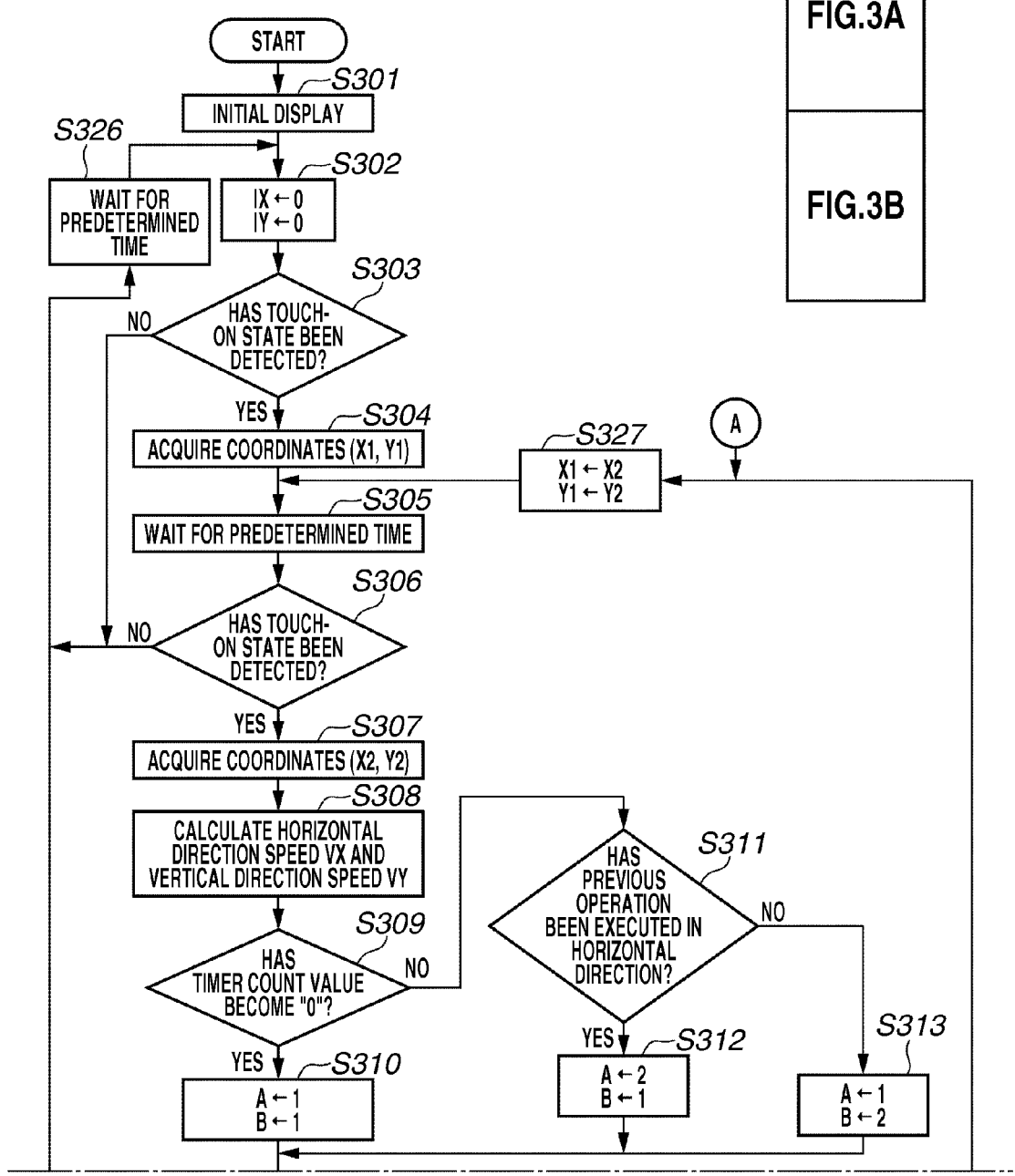

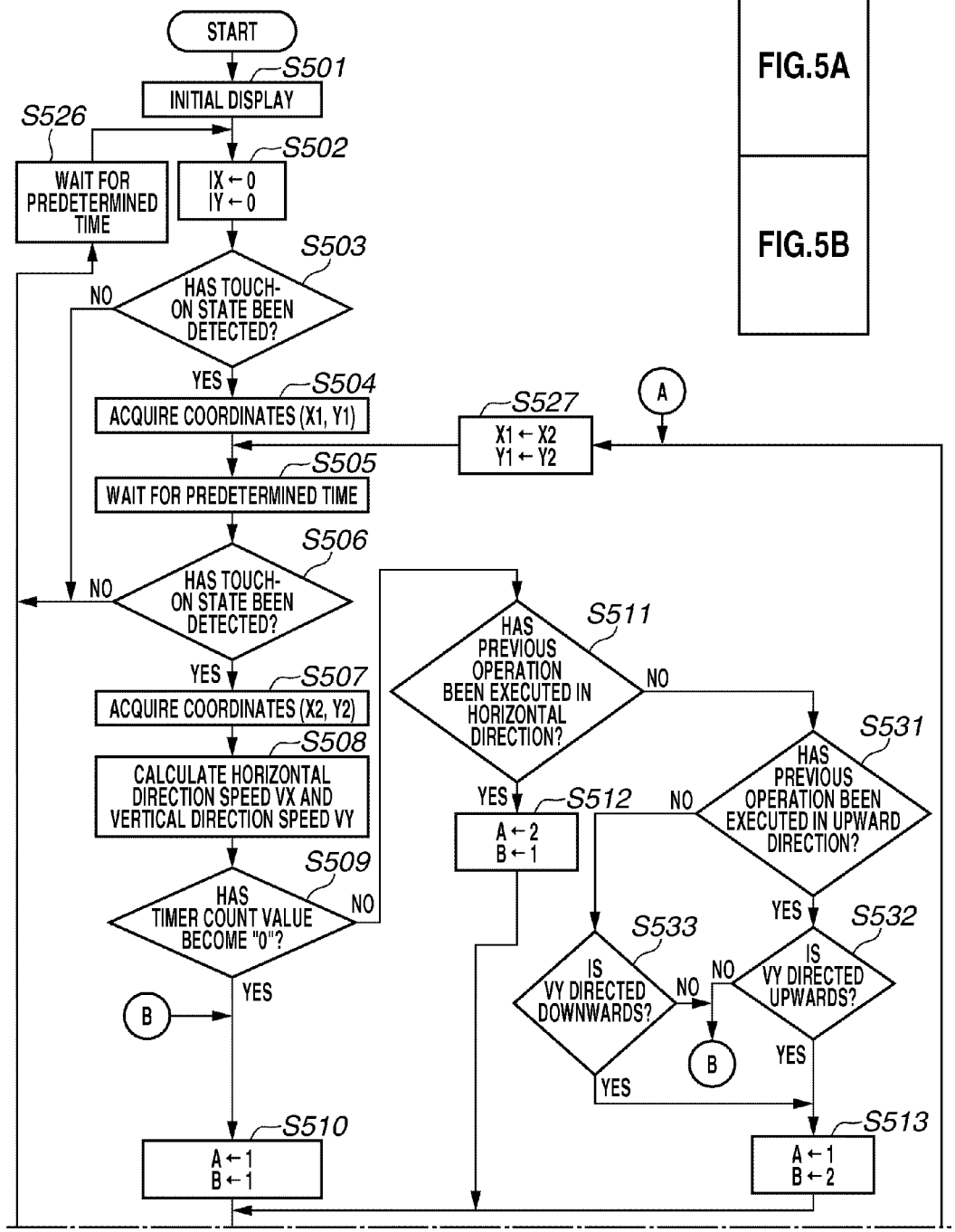

INFORMATION PROCESSING APPARATUS AND CONTROL METHOD THEREFOR

BACKGROUND OF THE INVENTION

1. Field of the Invention

The present invention relates to an information processing apparatus capable of controlling an operation according to an operation executed on a touch panel.

2. Description of the Related Art

In recent years, a digital device has been marketed which includes a touch panel in its display unit and enables a user to intuitively operate the device. In a digital device like this, a button icon is generally provided on a display screen including a touch panel. Furthermore, a user can execute a function assigned to the button icon by executing an operation for touching the touch panel on the button icon. In addition, a conventional method executes control according to a locus of positions on the screen touched by the user by touching a touch panel with his finger or a pen and by moving the finger or the pen touching the touch panel while keeping the touching on the touch panel with the finger or the pen.

As an example of control according to a locus of touched positions, Japanese Patent Application Laid-Open No. 63-174125 discusses the following method. More specifically, in this method, an image displayed on a display unit following the movement of the finger touching the touch panel is scrolled. In addition, when the user has stopped touching the touch panel with his finger, the speed of the scroll is gradually reduced to finally stop the scroll.

In addition, Japanese Patent Application Laid-Open No. 2005-44036 discusses the following method. More specifically, this conventional method detects the angle of the locus of the positions of touching the touch panel with respect to the horizontal edge of the display device. Furthermore, if the detected angle is within a predetermined angle, the corresponding image is scrolled in the horizontal direction. Furthermore, the method discussed in Japanese Patent Application Laid-Open No. 2005-44036 also detects the angle of the locus of the positions of touching the touch panel with respect to the vertical edge of the display device. If the detected angle is within a predetermined angle, the corresponding image is scrolled in the vertical direction.

However, in executing control according to the direction of operation based on the angle of the locus of touched positions, the above-described conventional methods determine the operation direction according to conditions set equally in a plurality of operation directions, which are targets of the determination, in executing the control assigned to each operation direction. Accordingly, if the user's touching operation has been executed by a wrong angle, the control assigned to a direction not desired by the user may be executed. In this case, a malfunction of the device may occur.

Suppose, as illustrated in FIG. 7, that the user has executed an operation for touching a touch panel 702 with his finger 701 in an arc-like shape starting with a start point 703 and ending at an endpoint 704 along a locus 705. In this case, the user is considered to have executed a downward operation from top down.

In this case, for the locus of the touched positions, the component of the locus from left to right is greater than the component of the locus from top down around the start point 703. Accordingly, the device determines that the user operation is an operation directed from left to right. Therefore, in this case, the device may execute control assigned to the rightward direction.

SUMMARY OF THE INVENTION

The present invention is directed to an information processing apparatus capable of highly precisely recognizing an operation desired and executed by a user in executing control according to a locus of positions of touching the touch panel.

According to an aspect of the present invention, an information processing apparatus includes an acquisition unit configured to acquire a plurality of touching positions on a locus of an operation for moving positions of touching a touch panel without discontinuing the touching on the touch panel, a determination unit configured to determine an operation direction of the operation by using a determination condition based on the plurality of touching positions acquired by the acquisition unit, a control unit configured to execute control, according to the operation direction determined by the determination unit, to perform an action predetermined in association with the operation direction, a storage control unit configured to execute control to store, on a memory, the operation direction determined by the determination unit, and a changing unit configured to change the determination condition based on the operation direction stored on the memory to determine an operation direction of a touching operation executed after the operation for which the operation direction has been determined and stored.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF THE EMBODIMENTS

Various exemplary embodiments, features, and aspects of the invention will be described in detail below with reference to the drawings.

Figure 1:
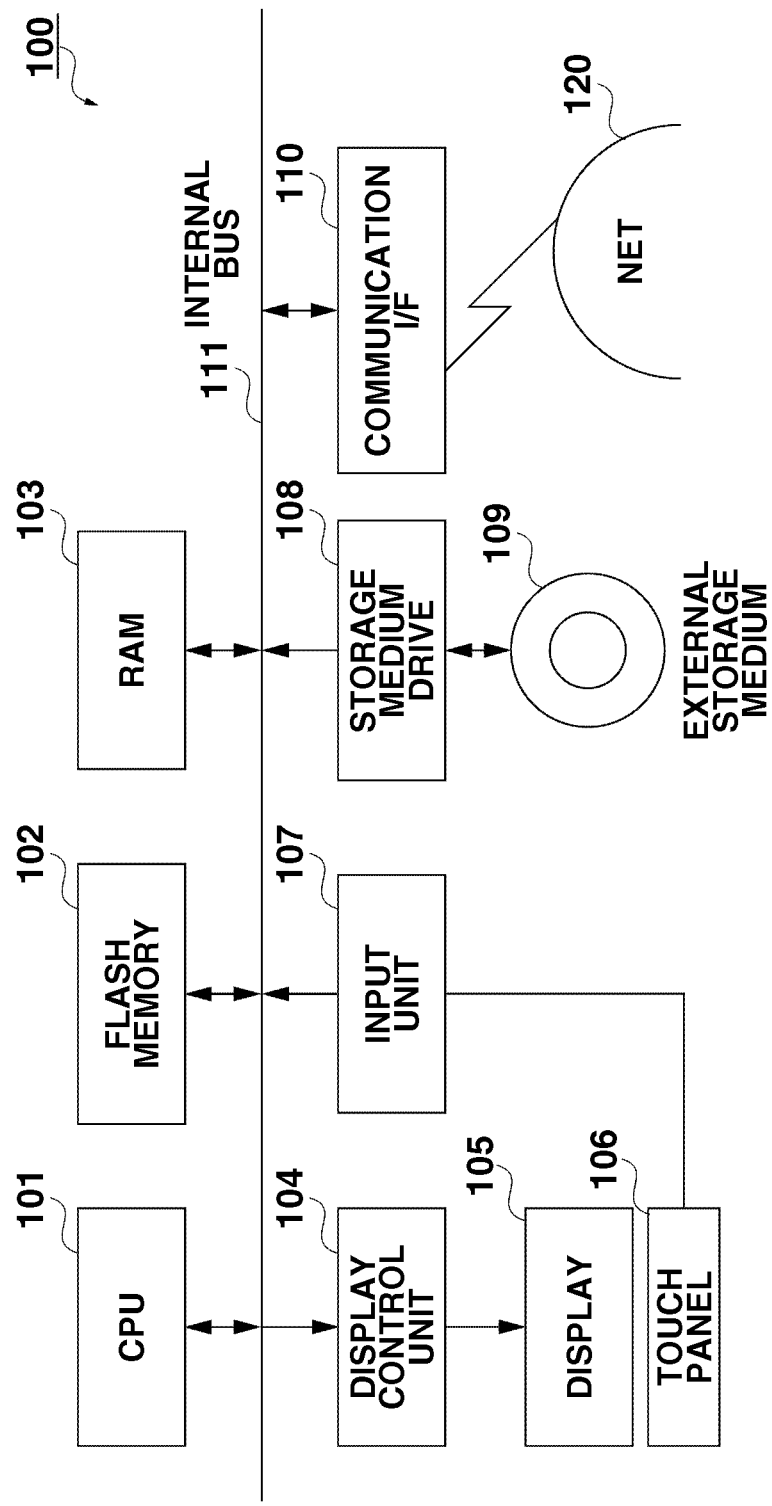
FIG. 1 is a block diagram illustrating an exemplary configuration of an information processing apparatus according to an exemplary embodiment of the present invention.

FIG. 1 illustrates an exemplary configuration of an information processing apparatus 100, to which each exemplary embodiment of the present invention can be applied. Referring to FIG. 1, a central processing unit (CPU) 101, a flash memory 102, a random access memory (RAM) 103, a display control unit 104, a display 105, an input unit 107, a touch panel 106, which is included in the input unit 107, a storage medium drive 108, and a communication interface (I/F) 110 are in communication with one another via an internal bus 111. Each component connected to the internal bus 111 can execute data communication via the internal bus 111.

The flash memory 102 is a non-volatile memory. The flash memory 102 temporarily stores image data or other data and stores various programs used by the CPU 101 to operate. The RAM 103 is a volatile work memory. The CPU 101 uses the RAM 103 as a work memory to control each component of the information processing apparatus 100 according to the program stored on the flash memory 102. Alternatively, the program for operating the CPU 101 can be previously stored on a read-only memory (ROM) (not illustrated) or a hard disk (not illustrated) instead of storing the same on the flash memory 102.

The input unit 107 receives a user operation. Furthermore, the input unit 107 generates a control signal according to the received user operation. Moreover, the input unit 107 supplies the generated control signal to the CPU 101. More specifically, the input unit 107 includes, as an input device for receiving a user operation, a text information input device, such as a keyboard, and a pointing device, such as a mouse or the touch panel 106. The touch panel 106 is an input device configured to output coordinate information about a position of touching the input unit, which has a flat structural shape.

The CPU 101 controls each component of the information processing apparatus 100 according to the control signal generated by and supplied from the input unit 107 according to a user operation executed via the input device and according to the corresponding program. Thus, the CPU 101 can cause the information processing apparatus 100 to execute an operation according to the input user operation.

The display control unit 104 outputs a display signal for controlling the display 105 to display an image. More specifically, a display control signal generated by the CPU 101 according to the program is supplied on the display control unit 104. Furthermore, the display control unit 104 executes control for displaying a GUI screen that constitutes a GUI on the display 105 according on the display control signal generated by the CPU 101.

The touch panel 106 is provided integrally with the display 105. More specifically, the touch panel 106 is configured so that the light transmissivity of the touch panel 106 does not interfere with the display by the display 105. The touch panel 106 having the configuration like this is mounted on an upper layer of the display surface of the display 105.

Furthermore, coordinates of an input executed via the touch panel 106 are associated with coordinates of display displayed on the display 105. With the above-described configuration, a GUI that allows the user to almost substantially directly operate the screen displayed on the display 105 can be configured.

To the storage medium drive 108, an external storage medium 109, such as a compact disc (CD), a digital versatile disc (DVD), or a memory card can be mounted. Furthermore, the storage medium drive 108 reads data from the external storage medium 109 mounted thereto and writes data on the external storage medium 109 under control of the CPU 101. The communication I/F 110 is an interface of communication with a network 120, such as a local area network (LAN) or the Internet, under control of the CPU 101.

The CPU 101 is capable of detecting the following user operation on the touch panel. More specifically, the CPU 101 is capable of detecting a user operation for touching the touch panel with his finger or a pen (hereinafter an operation of this type is simply referred to as a "touch-down (operation)"), a user state for continuing touching on the touch panel with his finger or a pen (hereinafter a state of this type is simply referred to as a "touch-on (state)"), a user operation for touching the touch panel with his finger and moving the same on the touch panel without discontinuing the touching state (hereinafter an operation of this type is simply referred to as a "move operation"), a user operation for discontinuing the touching on the touch panel with his finger or a pen (hereinafter an operation of this type is simply referred to as a "touch-up operation"), and a user non-operation state in which the user does not touch the touch panel (hereinafter this state is simply referred to as a "touch-off state").

The operation and coordinates corresponding to the position at which the user touches the touch panel with his finger or a pen is notified to the CPU 101 via the internal bus 111. The CPU 101 determines what user operation has been executed on the touch panel according to the notified information.

With respect to the moving operation, the direction of moving of the user's finger or the pen moving on the touch panel can be determined in relation to a vertical component and a horizontal component on the surface of the touch panel according to variation of the positional coordinates.

Suppose here that when the user has executed a touch-down operation, then a predetermined moving operation, and then a touch-up operation on the touch panel, the user has operated his finger or a pen in a stroke. In the present exemplary embodiment, an operation for executing a stroke is referred to as a "flick operation".

A flick operation is an operation in which the user touches the touch panel with his finger, then quickly moves his finger or the pen on the touch panel without discontinuing the touching state, and then discontinues the touching state after moving his finger or the pen from the touch panel by a specific distance on the surface of the touch panel. In other words, a flick operation is an operation for executing a sweep-like motion on the touch panel.

If a moving operation by the user for a predetermined distance or longer on the surface of the touch panel at a predetermined operation speed or higher is detected and a touch-up operation is detected in this state, then the CPU 101 determines that the user has executed a flick operation. On the other hand, if a moving operation by the user for a predetermined distance or longer on the surface of the touch panel at a speed lower than the predetermined operation speed is detected, then the CPU 101 determines that the user has executed a drag operation.

For the touch panel 106, various touch panels can be employed. More specifically, a resistance film type touch panel, a capacitance type touch panel, a surface acoustic wave type touch panel, an infrared-ray type touch panel, an electromagnetic induction type touch panel, an image recognition type touch panel, or an optical sensor type touch panel can be used.

In a first exemplary embodiment of the present invention, in executing scroll operations for scrolling an image in different directions in the horizontal direction and the vertical direction, consecutively executed flick operations are highly accurately determined as operations executed in the same direction as the operation direction of the previous operation.

Figure 2A:
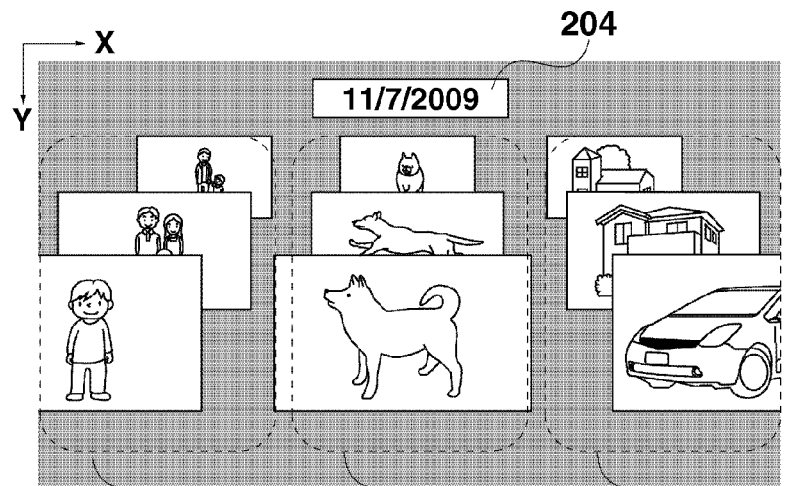
FIGS. 2A through 2C illustrate an example of a display on a graphic user interface (GUI) screen according to a first exemplary embodiment of the present invention.
Figure 2B:
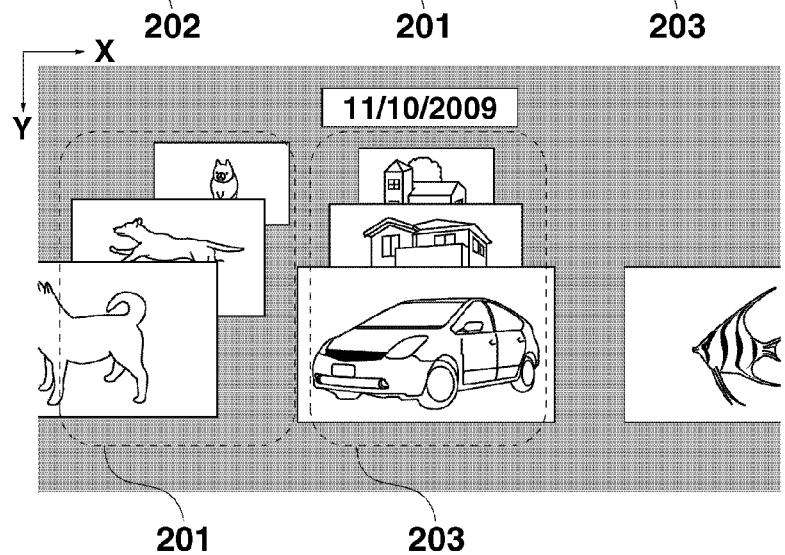
Figure 2C:
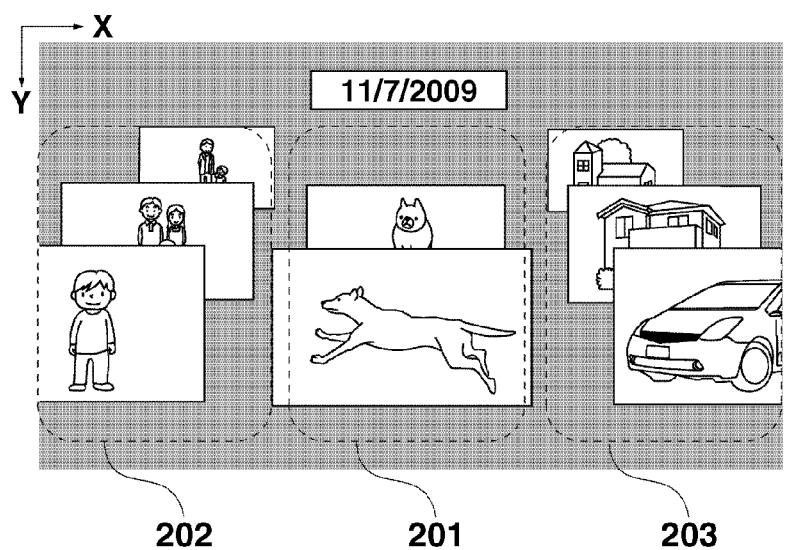

FIGS. 2A through 2C illustrate an example of a display of a GUI on the display 105 according to the first exemplary embodiment. In each example illustrated in FIGS. 2A through 2C, as illustrated by using a coordinate system on the upper-left corner of the figure, the left-to-rightward direction is taken as an X-positive direction, the right-to-leftward direction is taken as an X-negative direction, the top-down direction is taken as a Y-positive direction, and the bottom-up direction is taken as a Y-negative direction. Furthermore, the X-positive and the X-negative directions are collectively referred to as a horizontal direction and the Y-positive and the Y-negative directions are collectively referred to as a vertical direction.

In the example illustrated in FIG. 2A, images stored on the flash memory 102 are arranged in order of image shooting date. In the vertical direction, images taken on the same date are arranged in such an order that images having a later image shooting time are arranged towards the back of the screen virtual space compared to those with an earlier image shooting time (i.e., the shooting time of the images becomes later from the front towards the back of the screen virtual space in the Y-negative direction). The images arranged in the display screen is referred to as an "image array". In the horizontal direction, the images are arranged so that the images having a later shooting date are arranged to the right of those with an earlier shooting date (i.e., the images are arranged in shooting date order from left to right).

A date display 204 indicates the shooting date of images in the center image array. The date display 204 indicates that an image array 201, which is arranged in the center image array, includes images taken on Nov. 7, 2009. Accordingly, an image array 202 includes images taken on a specific day before Nov. 7, 2009. Furthermore, an image array 203 includes images taken on a specific day after Nov. 7, 2009.

If the user has executed a flick operation via the touch panel 106 on the screen, the CPU 101 determines the direction of the flick operation and executes control in the following manner. More specifically, if the user has executed a flick operation upwards, the CPU 101 scrolls one image displayed in the center image array in the direction of depth of the screen (i.e., towards the back of the virtual space of the screen). On the other hand, if the user has executed a flick operation downwards, the CPU 101 scrolls one image displayed in the center image array towards the front of the screen virtual space.

In other words, if the user has executed an upward flick operation, the upward flick operation functions as an operation for displaying an image whose shooting time is later among those of the images included in the center image array. On the other hand, if the user has executed a downward flick operation, the downward flick operation functions as an operation for displaying an image whose shooting time is earlier among those of the images included in the center image array.

In addition, if the user has executed a leftward flick operation, the CPU 101 scrolls one image array leftwards. On the other hand, if the user has executed a rightward flick operation, the CPU 101 scrolls one image array rightwards. In other words, if the user has executed a leftward flick operation, the CPU 101 displays, in the center of the screen as the center image array, an image array including images of shooting date later than those of the images included in the image array that has been displayed as the center image array before the leftward flick operation. On the other hand, if the user has executed a rightward flick operation, the CPU 101 displays, in the center of the screen as the center image array, an image array including images of shooting date earlier than those of the images included in the image array that has been displayed as the center image array before the rightward flick operation.

FIG. 2B illustrates an example of a screen displayed on the display 105 if the user has executed a leftward flick operation in the state of the screen illustrated in FIG. 2A. In the example illustrated in FIG. 2B, the image array 201, which includes the images taken on Nov. 7, 2009 and has been displayed in the center image array in the example illustrated in FIG. 2A, is moved leftwards by an amount of movement equivalent to one image array. Instead of the image array 201, the image array 203 is displayed as the center image array now.

The screen illustrated in FIG. 2C is displayed on the display 105 if the user has executed a downward flick operation in the state of the screen illustrated in FIG. 2A. More specifically, in the example illustrated in FIG. 2C, the image displayed at a lowermost position in the screen illustrated in FIG. 2A, of the images included in the center image array 201, has gone out of the screen. Furthermore, the image displayed at a middle location of the image array 201 in the screen illustrated in FIG. 2A is now displayed at a lowermost position of the image array 201. In addition, the image displayed at an uppermost position of the image array 201 in the screen illustrated in FIG. 2A is now displayed at a middle position of the image array 201.

Figure 7:
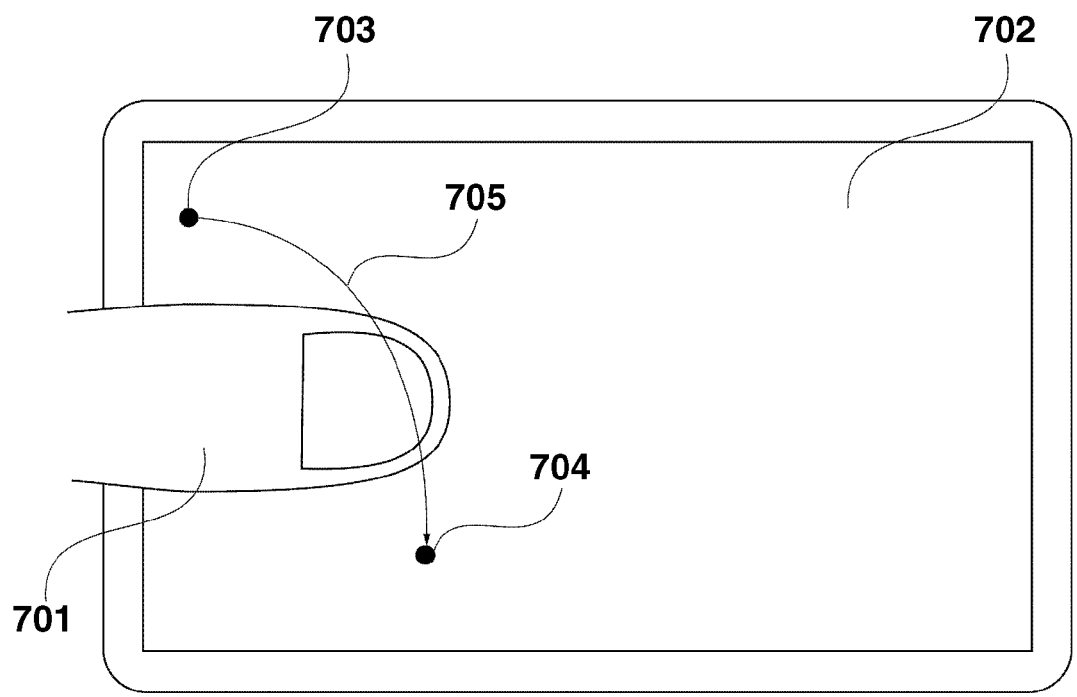
FIG. 7 illustrates an example of a touching operation whose operation direction may be misrecognized.

In the above-described conventional method, if the operation of the device is determined according to the direction of the flick operation executed on the touch panel, the direction of the locus of the flick operation actually executed on the touch panel may differ from the direction of the operation desired by the user as illustrated in FIG. 7. In this case, an operation not desired by the user may be executed. In particular, if operations in the same direction are consecutively and quickly repeated, the user may be aware of the direction of the first flick operation and can execute the first flick operation in the desired direction but the user may execute the second or later flick operations in directions different from the desired direction.

On the other hand, in the present exemplary embodiment, if the user executes consecutive flick operations, the consecutively executed flick operations are recognized as flick operations executed in the same direction of flick operation as the direction of the previous flick operation with a high accuracy. Accordingly, the present exemplary embodiment executes control for highly precisely recognizing the direction of an operation desired by the user.

In the present exemplary embodiment, the "direction of flick operation" refers to the operation direction determined by the information processing apparatus 100 according to the flick operation by the user. Furthermore, the information processing apparatus 100 executes an operation assigned to the flick operation. Processing that implements the above-described method will be described in detail below with reference to the following flow chart of FIG. 3.

Figure 3B:
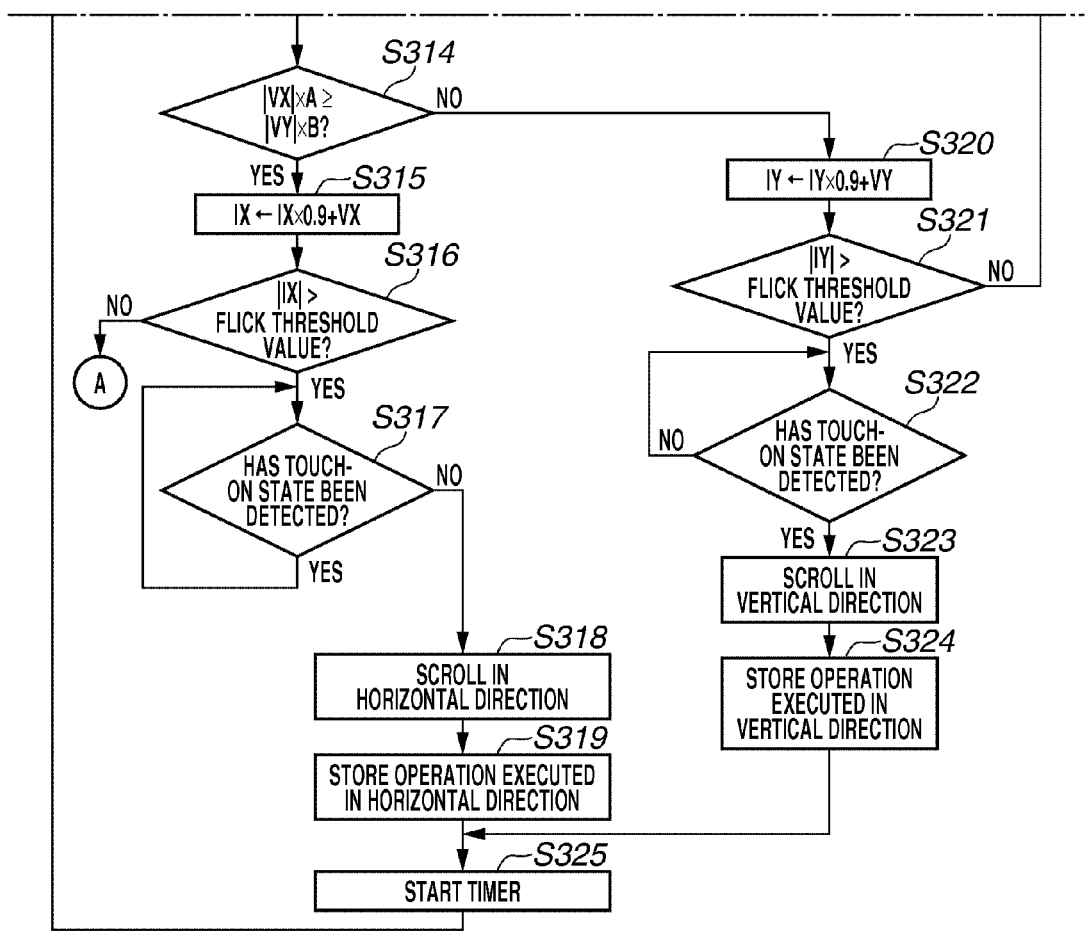
FIG. 3, composed of FIGS. 3A and 3B, is a flow chart illustrating an example of processing executed by a central processing unit (CPU) according to the first exemplary embodiment of the present invention.

FIG. 3 is a flow chart illustrating exemplary processing for determining the direction of a flick operation according to the present exemplary embodiment. Processing in each step of the flow chart of FIG. 3 is implemented by the CPU 101 by loading and executing a program from the flash memory 102 on the RAM 103.

When the user instructs changing to a mode for displaying the display illustrated in FIG. 2A by operating an operation unit included in the input unit 107, the processing in the flow chart of FIG. 3 starts. Referring to FIG. 3, in step S301, the CPU 101 executes an initial display. More specifically, the CPU 101 reads images to be displayed from the flash memory 102. Furthermore, the CPU 101 displays the read images in the image array illustrated in FIG. 2A on the display 105.

In step S302, the CPU 101 sets a value "0" to variables IX and IY, which are stored on the RAM 103 and used for accumulating the speed of the flick operation. The variables IX and IY will be described in detail below.

In step S303, the CPU 101 determines whether the touch panel 106 has been touched with the finger or a pen. More specifically, in step S303, the CPU 101 determines whether the touch-on state by the user has been detected. The determination executed in step S303 is a determination as to whether the touching state has shifted from the touch-off state to the touch-on state. Accordingly, the determination in step S303 is substantially a determination as to whether the touch-down operation has been executed.

If it is determined that the touch-on state has been detected (YES in step S303), then the processing advances to step S304. On the other hand, if it is determined that the touch-on state has not been detected (NO in step S303), then the processing advances to step S328.

In step S304, the CPU 101 acquires coordinates of the touching position on the touch panel 106 corresponding to the touch-on state. In addition, the CPU 101 records the acquired coordinates on the RAM 103 as coordinates (X1, Y1).

In step S305, the CPU 101 waits until a predetermined time elapses. More specifically, the CPU 101 waits until a predetermined time elapses in order to calculate the speed of the move operation based on the variation of coordinates of the input executed via the touch panel by utilizing the wait time from a timing of detection of the touch-on state in step S302 to the timing of detection of a next touch-on state.

In the present exemplary embodiment, it is supposed that the predetermined time is several tens to several hundreds of milliseconds. After the predetermined time has elapsed, the processing advances to step S306.

In step S306, the CPU 101, similar to the processing in step S303, determines whether the touch-on state has been detected. If it is determined that the touch-on state has been detected (YES in step S306), then the processing advances to step S307. On the other hand, if it is determined that that the touch-on state has not been detected (NO in step S306), then the CPU 101 recognizes that no flick operation or drag operation has been executed. In this case, the processing advances to step S326.

In step S307, the CPU 101 acquires coordinates of the touching position on the touch panel 106 corresponding to the touch-on state. In addition, the CPU 101 records the acquired coordinates on the RAM 103 as coordinates (X2, Y2). By executing the above-described processing, the CPU 101 acquires a plurality of positions (i.e., positions corresponding to coordinates (X1, Y1) and (X2, Y2)) of the operation for touching the touch panel 106 and moving the touching position while keeping the touching state.

In step S308, the CPU 101 calculates the speed of moving in the horizontal direction and in the vertical direction for the moving of the touching positions in the touch-on state according to the coordinate information acquired in steps S304 and S307. More specifically, the speed of movement in the horizontal direction can be calculated utilizing an expression "X2−X1". The speed of movement in the vertical direction can be calculated utilizing an expression "Y2−Y1".

The CPU 101 stores the calculated speed values on the RAM 103 as variables VX and VY. The accurate speed can be calculated by dividing a result of the expressions "X2−X1" and "Y2−Y1" by the predetermined wait time in step S305. Accordingly, the speed can be calculated in this manner.

However, because the wait time in step S305 is a constant time, whether to execute the above-described division does not affect the comparison between the speed in the direction of the X-axis and that in the direction of the Y-axis or to the comparison between the speed at a specific timing and the speed at a different other timing. Accordingly, in the present exemplary embodiment, the division is omitted. Then, the processing advances to step S309.

In step S309, the CPU 101 determines whether the timer that starts in step S325 has become the time-out state and has a counter value "0". The timer is used for counting the elapsed time since the image array has been scrolled last in the left-rightward direction or in the top-bottom direction. If the value of the timer is "0" (YES in step S309), then the CPU 101 determines that the predetermined time or longer has elapsed since the timing of the previous scroll operation. Accordingly, in this case, the processing advances to step S310. On the other hand, if it is determined that the value of the timer is not "0" (NO in step S309), then the processing advances to step S311.

In step S310, the CPU 101 stores a value "1" to both of variables A and B, which are used in determination in step S314.

The variables A and B are variables used for changing the weight of the speed in the horizontal direction and in the vertical direction, respectively. More specifically, the greater than "1" the variable becomes, the surer it becomes to determine the flick operation direction as the horizontal direction or the vertical direction, respectively. Then, the processing advances to step S314.

In step S311, the CPU 101 reads the direction of the flick operation (the direction determined the last time) of the previous operation from the RAM 103 and determines whether the previous flick operation has been executed in the horizontal direction.

If the previous flick operation has been executed in the horizontal direction (YES in step S311), then the processing advances to step S312. On the other hand, if it is determined that the previous flick operation has not been executed in the horizontal direction (NO in step S311), then the processing advances to step S313 based on the determination that the previous flick operation has been executed in the vertical direction.

In step S312, the CPU 101 stores a value "2" to the variable A and a value "1" to the variable B, which are to be used in the determination in step S314. As a result, the flick operation can be more accurately determined to have been executed in the horizontal direction in step S314. Then the processing advances to step S314.

In step S313, the CPU 101 stores a value "1" to the variable A and a value "2" to the variable B, which are to be used in the determination in step S314. As a result, the direction of the flick operation can be more accurately determined to have been executed in the vertical direction in step S314. Then the processing advances to step S314.

In step S314, the CPU 101 compares a value calculated by an expression "|VX|×A", which is a value calculated by multiplying the absolute value of the speed component in the direction of the X-axis by the weight variable A, and a value calculated by an expression "|VY|×B", which is a value calculated by multiplying the absolute value of the speed component in the direction of the Y-axis by the weight variable B, for their magnitude and determines which value is greater.

Each of the absolute values of the speed component |VX| and |VY| is a value calculated based on a plurality of touching positions of touching by the operation for moving on the touch panel 106 while keeping the state of touching the touch panel 106. Accordingly, a condition for determining the direction of flick operation "|VX|×A≥|VY|×B" is a condition based on the plurality of touching positions of the operation for moving the touching position on the touch panel 106 while keeping the state of touching on the touch panel 106.

If it is determined that $|VX| \times A \geq |VY| \times B$ (YES in step S314), then the processing advances to step S315. On the other hand, if it is determined that the condition "$|VX| \times A \geq |VY| \times B$" is not satisfied (NO in step S314), then the processing advances to step S320.

In step S315, the CPU 101 stores a value calculated by an expression "IX×0.9+VX" to a variable IX, which has been stored on the RAM 103. In the present exemplary embodiment, the variable IX is a variable used for accumulating the speed of the flick operation in the horizontal direction. More specifically, in the present exemplary embodiment, the accumulated value is multiplied by 0.9 so that the accumulated value decreases when the speed is low, i.e., in order not to determine that an operation is a flick operation when the speed is low. Then, the processing advances to step S316.

In step S316, the CPU 101 determines whether the absolute value |IX| is greater than a predetermined flick threshold value. If it is determined that the absolute value |IX| is greater than the predetermined flick threshold value (YES in step S316), then the processing advances to step S317 based on the determination that the flick operation has been executed in the horizontal direction. On the other hand, if it is determined that the absolute value |IX| is not greater than the predetermined flick threshold value (NO in step S316), then the processing advances to step S327. In the present exemplary embodiment, the value |IX| is an absolute value of IX.

In step S317, the CPU 101 determines whether the current operation state of the information processing apparatus 100 is the touch-on state. If it is determined that the current operation state of the information processing apparatus 100 is the touch-on state (YES in step S317), then the CPU 101 repeats the processing in step S317 and waits until the touch-on state ends (i.e., waits until the touch-up operation is executed). On the other hand, if it is determined that the current operation state of the information processing apparatus 100 is not the touch-on state (NO in step S317), then the processing advances to step S318. The processing in step S317 is executed in order not to scroll the image included in the image array before the touch-up operation is executed.

In step S318, the CPU 101 transmits a control signal to the display control unit 104, which differs according to the direction of the speed component in the horizontal direction accumulated in the variable IX. More specifically, the content of the control signal transmitted in step S318 is determined according to which of the rightward direction (the rightward direction corresponds to a positive value) and the left direction (the leftward direction corresponds to a negative value) the sign of the speed component is.

To paraphrase this, if the speed component in the horizontal direction accumulated in the variable IX is directed rightwards, the CPU 101 transmits a control signal for controlling the display control unit 104 to scroll the image array by one image array rightwards. On the other hand, if the speed component in the horizontal direction accumulated in the variable IX is directed leftwards, the CPU 101 transmits a control signal for controlling the display control unit 104 to scroll the image array by one image array leftwards.

As a result, the display control unit 104 generates a video for scrolling the image array by one array rightwards or leftwards and outputs the generated video to the display 105. Then, the processing advances to step S319. In step S319, the CPU 101 writes and stores information indicating that the image array has been scrolled in the horizontal direction on the RAM 103. Then, the processing advances to step S325.

In step S320, the CPU 101 stores "IY×0.9+VY" to the variable IY. In the present exemplary embodiment, "IY" is a variable used for accumulating the speed of the flick operation executed in the vertical direction. Similar to the processing in step S315, the CPU 101 multiplies the accumulated values by 0.9 in order not to determine that an operation executed at a low speed is a flick operation. Then, the processing advances to step S321.

In step S321, the CPU 101 determines whether the absolute value |IY| is greater than a predetermined flick threshold value. If it is determined that the absolute value |IY| is greater than the predetermined flick threshold value (YES in step S321), then the processing advances to step S322 based on the determination that the flick operation has been executed in the vertical direction. On the other hand, if it is determined that the absolute value |IY| is not greater than the predetermined flick threshold value (NO in step S321), then the processing advances to step S327. In the present exemplary embodiment, the value |IY| is an absolute value of IY.

In step S322, the CPU 101 determines whether the current operation state of the information processing apparatus 100 is the touch-on state. If it is determined that the current operation state of the information processing apparatus 100 is the touch-on state (YES in step S322), then the CPU 101 repeats the processing in step S322 and waits until the touch-on state ends (i.e., waits until the touch-up operation is executed). On the other hand, if it is determined that the current operation state of the information processing apparatus 100 is not the touch-on state (NO in step S322), then the processing advances to step S323. The processing in step S322 is executed in order not to scroll the image included in the image array before the touch-up operation is executed.

In step S323, the CPU 101 transmits a control signal to the display control unit 104, which differs according to the direction of the speed component in the vertical direction accumulated in the variable IY. More specifically, the content of the control signal transmitted in step S323 is determined according to which of the upward direction (i.e., the upward direction corresponds to a negative value) and the downward direction (i.e., the downward direction corresponds to a positive value) the direction of the speed component is.

To paraphrase this, if the speed component in the vertical direction accumulated in the variable IY is directed upwards, the CPU 101 transmits a control signal for controlling the display control unit 104 to scroll one image included in the center image array in the direction of depth of the screen. On the other hand, if the speed component in the vertical direction accumulated in the variable IY is directed downwards, the CPU 101 transmits a control signal for controlling the display control unit 104 to scroll one image included in the center image array towards the front of the screen.

As a result, the display control unit 104 generates a video for scrolling the image included in the center image array in the direction of depth or towards the front of the screen and outputs the generated video to the display 105. Then, the processing advances to step S324. In step S324, the CPU 101 writes and stores information indicating that the image included in the center image array has been scrolled in the vertical direction on the RAM 103. Then, the processing advances to step S325.

In step S325, the CPU 101 starts a timer for determining whether a predetermined time T has elapsed since the last scroll of the image array in the left-right (horizontal) direction or in the top-down (vertical) direction. The value of the timer becomes "0" when the time T elapses. Then, the processing advances to step S326.

In step S326, the CPU 101 waits until a predetermined time elapses. The predetermined time is a period for sampling the state of the touch panel 106 and is different from the time T described above. If the predetermined time has elapsed, then the processing returns to step S302. In step S302, the CPU 101 initializes the variables IX and IY to execute a determination as to whether a flick operation has been newly executed since the next touch-on state and repeats the processing in step S302.

The processing in step S327 is executed if the touching position has not moved by an amount large enough to be determined that the touch-on state has continued and that a flick operation has been executed. More specifically, in step S327, in order to continuously measure the speed of movement of the touched position, the CPU 101 stores the current variable X2 to a new variable X1 and the current variable Y2 to a new variable Y1. Then, the processing returns to step S305.

By executing the processing in the flowchart of FIG. 3, the present exemplary embodiment stores the determined direction of the previous flick operation in step S319 or S324. In addition, if a flick operation has been executed within the predetermined time since the previous flick operation (NO in step S309), then the CPU 101 changes the condition for determining the direction of flick operation in step S312 or S313 in order to basically determine that the flick operation has been executed in the same axial direction as (in parallel to) the stored direction of flick operation.

The above-described configuration is employed because of the following reasons. More specifically, if the user executes flick operations consecutively in the same axial direction, the user can execute the operations very quickly because the operations are only repeatedly executed. Furthermore, if the interval between flick operations is short, it is likely that the operation has been executed in the same axial direction as the direction of the previous flick operation.

On the other hand, if the direction of the flick operation is changed to the direction along a different other axis, the interval between the operations in this case becomes longer than that of the flick operations executed consecutively in the same axial direction. This is because in this case, it is necessary for the user to change the motion of his finger and because the user becomes aware of the change in the motion of his finger.

Accordingly, if the time T is determined to have elapsed since the previous flick operation in step S309, then the CPU 101 sets an equal value as the value of the weight variable. In other words, the present exemplary embodiment uses the same condition for determining the direction of the current flick operation for the X-axis direction and the Y-axis direction regardless of in which direction the previous flick operation has been executed.

More specifically, in the present exemplary embodiment, the condition for determining the flick operation is changed according to the direction of the previous flick operation only when a flick operation is executed again before the time T elapses after the touching by the last flick operation ends. Furthermore, if a flick operation is executed after the time T has elapsed after the touching by the previous flick operation ends, the CPU 101 does not assign weight based on the direction of the previous flick operation.

According to the first exemplary embodiment described above, the possibility of executing an operation different from the user's desire can be effectively reduced even if the direction of the user's operation fluctuates during the flick operations consecutively and quickly executed.

Now, a second exemplary embodiment of the present invention will be described in detail below. In the above-described first exemplary embodiment, if the user executes flick operations consecutively in either the positive or the negative direction, it is basically determined that the consecutive flick operations have been executed in the same axial direction for the operation direction of the flick operations.

In the present exemplary embodiment, if the user consecutively executes flick operations, the operation executed in the same positive (or negative) axial direction as the direction of the previous flick operation only is to be easily determined as the direction of the current operations.

Figure 4:
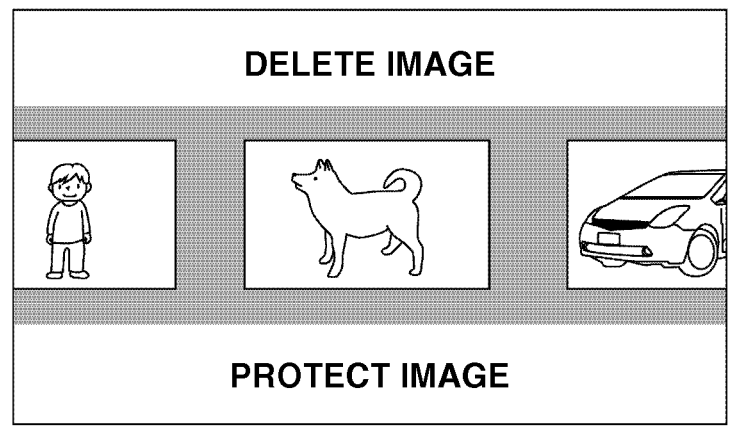
FIG. 4 illustrates an example of a display on a GUI screen according to a second exemplary embodiment of the present invention.

FIG. 4 illustrates an example of a display of a GUI screen displayed on the display 105 according to the present exemplary embodiment. In the present exemplary embodiment, the image can be scrolled by a flick operation executed in the horizontal direction. Furthermore, the image can be deleted by executing a flick operation in the upward direction. Furthermore, the image can be protected by executing a flick operation in the downward direction.

In the example of display illustrated in FIG. 4, images are arranged and displayed in the horizontal direction. Furthermore, the images can scrolled in the rightward direction by executing a flick operation in the rightward direction on the touch panel 106. Furthermore, the images can be scrolled in the leftward direction by executing a flick operation in the leftward direction on the touch panel 106.

In an upper portion and a lower portion of the screen illustrated in FIG. 4, an operation corresponding to the flick operation in each direction is displayed. More specifically, if the user executes a flick operation in the upward direction, the image displayed in the center of the screen is deleted. On the other hand, if it is determined that if the user executes a flick operation in the downward direction, the image displayed in the center of the screen is protected.

In the GUI according to the present exemplary embodiment, both flick operations executed in the rightward and the leftward direction correspond to the scroll of the image. More specifically, the characteristic of the flick operation executed in the rightward and the leftward directions is the same although the image is scrolled in different directions.

On the other hand, for the flick operations executed in the upward and the downward directions, the characteristics of the operations significantly differ from each other because the flick operation executed in the upward direction corresponds to the function for deleting the image while the flick operation executed in the downward direction corresponds to the function for protecting the image.

Therefore, in the present exemplary embodiment, if the user consecutively executes flick operations in the vertical direction in a short period of time, it is not likely that the user changes the flick operation in the reversed direction. Accordingly, in the present exemplary embodiment, different from the first exemplary embodiment, if the user executes the previous flick operation in the upward direction, then the direction of the flick operation is basically and easily determined to have been executed in the upward direction only. In other words, the likelihood of the current flick operation being determined to be in the upward direction is increased. Furthermore, if the user executes the previous flick operation in the downward direction, then the direction of the flick operation is basically and easily determined to have been executed in the downward direction only.

Figure 5B:
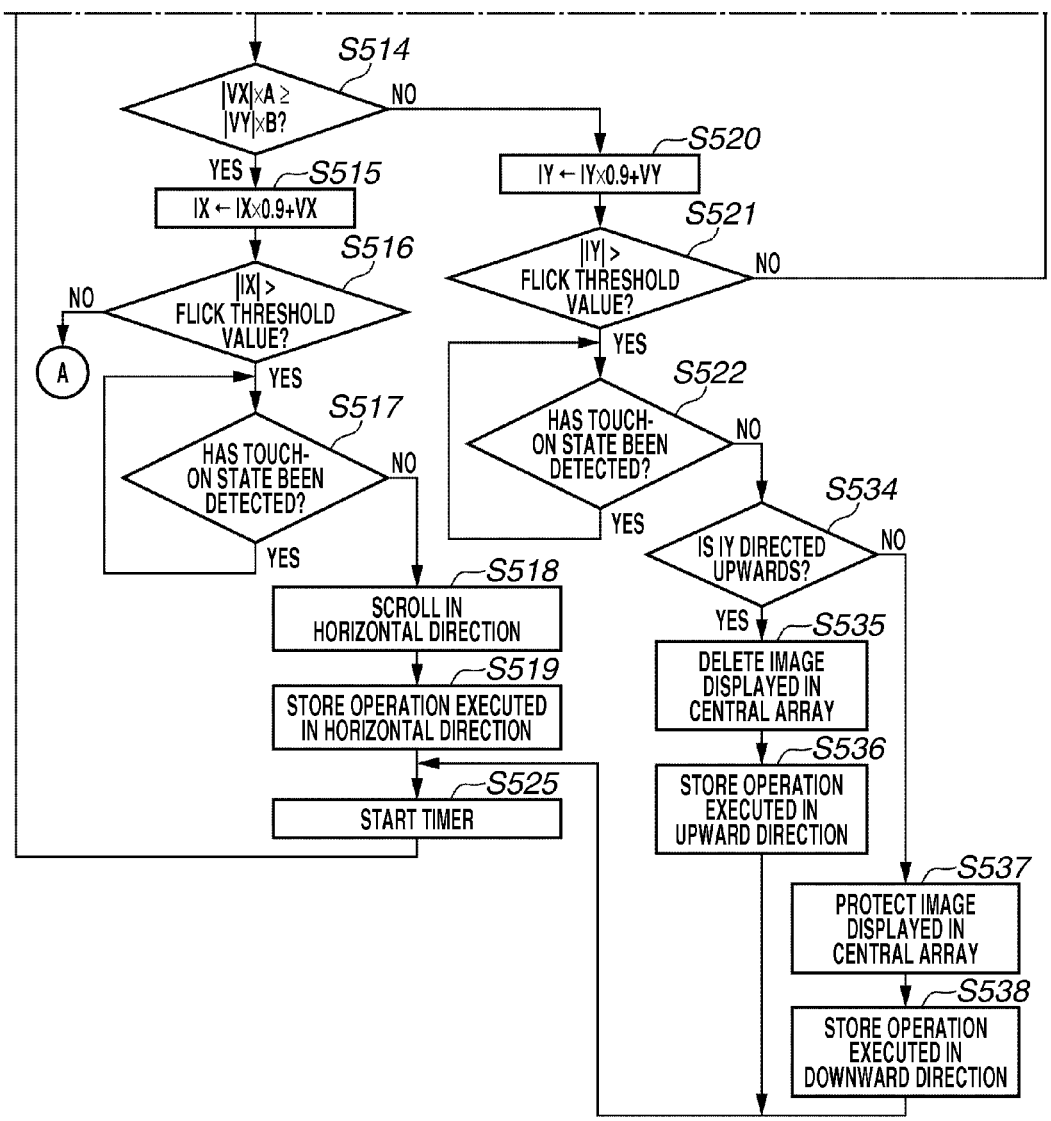
FIG. 5, composed of FIGS. 5A and 5B, is a flow chart illustrating an example of processing executed by a CPU according to the second exemplary embodiment of the present invention.

Now, exemplary processing that implements the above-described configuration will be described in detail below with reference to the flow chart of FIG. 5. FIG. 5 is a flow chart illustrating an example of processing for determining the direction of a flick operation according to the present exemplary embodiment. Processing in each step of the flow chart of FIG. 5 is implemented by the CPU 101 by loading and executing a program from the flash memory 102 on the RAM 103.

Processing in most of the steps of the flow chart of FIG. 5 is similar to the processing illustrated in FIG. 3. More specifically, processing in steps S501 through S522 illustrated in FIG. 5 is similar to the processing in steps S301 through S322 illustrated in FIG. 3. Furthermore, processing in steps S525 through S527 illustrated in FIG. 5 is similar to the processing in steps S325 through S327 illustrated in FIG. 3. Accordingly, the detailed description thereof will not be repeated here.

The processing in the flow chart of FIG. 5 differs from the processing illustrated in FIG. 3 in the following points only. In other words, if it is determined "NO" in step S511, the CPU 101 executes processing in steps S531 through S533. In addition, if it is determined "NO" in step S522, then the CPU 101 executes processing in steps S534 through S538. Accordingly, the points in difference only will be described in detail below.

Referring to FIG. 5, in step S511, the CPU 101 reads the direction of the previous flick operation from the RAM 103 to determine whether the previous flick operation has been executed in the horizontal direction. If it is determined that the previous flick operation has been executed in the horizontal direction (YES in step S511), then the processing advances to step S512. On the other hand, if it is determined that the previous flick operation has not been executed in the horizontal direction (NO in step S511), then the processing advances to step S531 based on the recognition that the previous flick operation has been executed in the positive vertical direction (i.e., in the downward direction) or in the negative vertical direction (i.e., in the upward direction).

In step S531, the CPU 101 determines whether the direction of the previous flick operation, which has been stored on the RAM 103, is upward. In the present exemplary embodiment, information indicating that the previous flick operation has been executed in the upward direction is recorded if processing in step S536 is executed in the processing for the previous flick operation.

If the direction of the previous flick operation is the upward direction, (YES in step S531), then the processing advances to step S532. On the other hand, if it is determined that the direction of the previous flick operation is not the upward direction (i.e., if the direction of the previous flick operation is the downward direction) (NO in step S531), then the processing advances to step S533.

In step S532, the CPU 101 determines whether the vertical direction speed component VY, which has been calculated in step S508, corresponds to the speed of the flick operation executed in the upward direction. In other words, in step S532, the CPU 101 determines whether the speed component VY has a negative value.

If it is determined that the vertical direction speed component VY corresponds to the speed of the flick operation executed in the upward direction (YES in step S532), then the processing advances to step S513 so that the direction of the current flick operation can be basically and easily determined as the same upward direction as the direction of the previous flick operation. This is because in this case, the direction of the vertical direction speed component is the same as that of the previous flick operation if the speed component VY corresponds to the speed of the flick operation executed in the upward direction.

On the other hand, if it is determined that the vertical direction speed component VY does not correspond to the speed of the flick operation executed in the upward direction (NO in step S532), the speed component VY corresponds to the speed of the flick operation executed in the downward direction, which is reverse to the direction of the flick operation on the same axis. In this case, the processing advances to step S510 because it is not necessary to easily determine that the direction of the current flick operation is the same upward direction as the direction of the previous flick operation. In step S510, the CPU 101 does not assign weight to the determination condition.

In step S533, the CPU 101 determines whether the vertical direction speed component VY, which has been calculated in step S508, corresponds to the speed of the flick operation executed in the downward direction. In other words, in step S533, the CPU 101 determines whether the vertical direction speed component has a positive value.

If it is determined that the vertical direction speed component VY corresponds to the speed of the flick operation executed in the downward direction (YES in step S533), then the processing advances to step S513 so that the direction of the current flick operation can be basically and easily determined as the same downward direction as the direction of the previous flick operation. This is because in this case, the direction of the vertical direction speed component is the same as that of the previous flick operation if the speed component VY corresponds to the speed of the flick operation executed in the downward direction.

On the other hand, if it is determined that the vertical direction speed component VY does not correspond to the speed of the flick operation executed in the downward direction (NO in step S533), the speed component VY corresponds to the speed of the flick operation executed in the upward direction, which is reverse to the direction of the flick operation on the same axis. In this case, the processing advances to step S510 because it is not necessary to easily determine that the direction of the current flick operation is the same upward direction as the direction of the previous flick operation. In step S510, the CPU 101 does not assign weight to the determination condition.

In step S513, because the speed component of the current flick operation in the direction of the Y-axis corresponds to the flick operation executed in the same direction as the direction of the previous flick operation, the CPU 101 stores a value "1" to the variable A and a value "2" to the variable B, which are used in the determination in step S514. By executing the processing in step S513, the present exemplary embodiment increases the possibility of determining that the current flick operation has been executed in the same direction as the direction of the previous flick operation even if the speed of the flick operation in the direction of the X-axis is somewhat greater than the speed of the flick operation in the direction of the Y-axis.

On the other hand, if it is determined that the information processing apparatus 100 is not in the touch-on state (NO in step S522), then the processing advances to step S534. In step S534, the CPU 101 determines whether the vertical direction speed component accumulated in the variable IY corresponds to the flick operation executed in the upward direction (i.e., whether the vertical direction speed component has a negative value). If it is determined that the vertical direction speed component accumulated in the variable IY corresponds to the flick operation executed in the upward direction (YES in step S534), then the processing advances to step S535. On the other hand, if it is determined that the vertical direction speed component accumulated in the variable IY does not correspond to the flick operation executed in the upward direction (NO in step S534), then the processing advances to step S537 because the vertical direction speed component corresponds to the flick operation executed in the downward direction.

In step S535, the CPU 101 deletes the image displayed in the center of the display 105 by changing file management information stored on the flash memory 102. Then, the processing advances to step S536. In step S536, the CPU 101 writes and stores information indicating that the flick operation executed in the upward direction has been received (i.e., that the direction of the flick operation has been determined to be the upward direction) on the RAM 103. Then, the processing advances to step S525.

In step S537, the CPU 101 protects the image displayed in the center of the display 105. More specifically, the CPU 101 changes the file management information stored on the flash memory 102 to set write protection on the image displayed in the center of the display 105.

Then, the processing advances to step S538. In step S538, the CPU 101 writes and stores information indicating that the flick operation executed in the downward direction has been received (i.e., that the direction of the flick operation has been determined to be the downward direction) on the RAM 103. Then, the processing advances to step S525.

According to the second exemplary embodiment described above, different functions not related to each other are assigned to flick operations in two different directions in the same axial direction. In addition, in the present exemplary embodiment, if the user consecutively executes flick operations, the operation executed in the same positive (or negative) axial direction as the direction of the previous flick operation only is to be easily determined as the direction of the current operations. According to the present exemplary embodiment having the above-described configuration, it is possible to effectively prevent execution of an operation not desired by the user.

In the second exemplary embodiment, in the direction of the X-axis (i.e., in the horizontal direction), similar to the first exemplary embodiment, if flick operations are consecutively executed, the same axial direction is easily determined to be the direction of the flick operation either positive or negative. This configuration is employed due to the following reasons.

More specifically, in the present exemplary embodiment, the left scroll function and the right scroll function, which are related to each other or have the similar characteristic, are assigned to flick operations in two different directions in the same X-axis direction. Furthermore, the operations may be consecutively executed by frequently changing to and from the positive direction or the negative direction.

In addition, the "operations (functions) related to each other or have the similar characteristic" include a plurality of operations having an increase/decrease relationship or a raising-lowering relationship for the same function, such as the increase or decrease of the volume of the sound to be output, adjustment of various setting values or various processing parameter values, or forwarding and reversing the reproduction location of a moving image or audio data.

According to each exemplary embodiment described above, in executing control based on the locus of touching positions of touching the touch panel, it is possible to highly precisely recognize the operation desired by the user according to the content of the previous operation.

In each exemplary embodiment of the present invention, weight can be assigned to the condition for determining the direction of the flick operation according to the operation mode of the information processing apparatus 100. More specifically, if operations different from each other are assigned to the flick operations in the X-axis direction and in the Y-axis direction as in the first and the second exemplary embodiments described above, then it is useful to change the weight to be assigned to the condition for determining the direction of the flick operation according to the direction of the previous flick operation.

On the other hand, if the information processing apparatus 100 is in a magnified display mode, in which the image is displayed in a magnified state, if a scroll function for changing the magnified area in the upward, downward, leftward, and rightward directions has been assigned to the flick operations executed in the upward, downward, leftward, and rightward directions, then the CPU 101 can change the weight assigned to the condition for determining the direction of the flick operation in the above-described manner.

In other words, if the information processing apparatus 100 is in a first operation mode (a first mode), then the CPU 101 assigns weights to the operation direction determination condition. On the other hand, if the information processing apparatus 100 is in a second operation mode (a second mode), then the CPU 101 does not assign weights to the operation direction determination condition.

If the user is allowed to execute a scroll in mutually different directions by executing flick operations in four different directions, the user may frequently change the desired operation direction. In other words, it is more likely that a flick operation is not in the same direction as the previous flick operation. Accordingly, if the flick operation direction determination condition is changed according to the direction of the previous flick operation, the user operation may be adversely hindered. Therefore, if the information processing apparatus 100 is in the above-described operation mode, the CPU 101 does not assign weights to the operation direction determination condition regardless of the direction of the previous flick operation.

As the operation mode in which the user is allowed to scroll the image in mutually different directions by executing flick operations in four different directions, a mode can be used in which a map image is displayed and the displayed part can be changed. Each of the above-described modes is an operation mode for changing the displayed part of the same display target image.

In addition, for the operation mode in which operations executed in any flick direction does not have an increase-decrease relationship or a raising-lowering relationship, it is useful if no weight is assigned to the operation direction determination condition because it can be considered in this case that the user may frequently change the desired operation direction.

In the examples illustrated in FIGS. 3 and 5, the CPU 101 changes the condition for determining the operation of the flick operation to easily determine the direction of the current flick operation to be the same direction as the direction of the previous flick operation. However, it is also useful if the CPU 101 changes the condition for determining the direction of the current flick operation not to easily determine the direction of the current flick operation to be the same direction as the direction of the previous flick operation.

This configuration is useful due to the following reasons. More specifically, if a user executes flick operations in the same direction, the user may become accustomed to moving his finger or the pen in the same direction by repeated operations. If the user accustomed to moving his finger or the pen in the same direction executes flick operations in a direction different from the direction of the operations to which the user is accustomed, then the user may not be able to accurately execute the flick operation in the different direction because the user has become very accustomed to the operation for flicking in the original direction although the user desires to move his finger or the pen in the different direction.

In order to address the above-described problem, the following configuration can also be employed. More specifically, if the direction different from the direction of the previous flick operation is easily determined to be the direction of the current flick operation, then the direction of the current flick operation can be determined to be the flick operation direction different from the direction of the previous or earlier flick operations even if the user has failed to execute the current flick operation in the direction completely different from the direction of the previous flick operation.

In order to easily determine the operation direction different from the direction of the previous flick operation as the direction of the current flick operation, it is useful to modify the above-described exemplary embodiment by setting a value "1" to the variable A and a value "2" to the variable B in step S312 (FIG. 3) and a value "2" to the variable A and a value "1" to the variable B in step S313 (FIG. 3). For the processing illustrated in FIG. 5, in order to easily determine the operation direction different from the direction of the previous flick operation as the direction of the current flick operation, it is useful to modify the above-described exemplary embodiment by setting a value "1" to the variable A and a value "2" to the variable B in step S512 (FIG. 5) and a value "2" to the variable A and a value "1" to the variable B in step S513 (FIG. 5). With this configuration also, the effect of the present exemplary embodiment for accurately recognizing the operation desired by the user can be implemented.

In each exemplary embodiment of the present invention described above, the present invention is applied to the information processing apparatus 100. However, the present invention is not limited to this. More specifically, the present invention can be applied to an information processing apparatus capable of executing control by using a touch panel, such as a personal computer (PC), a personal digital assistant (PDA), a portable telephone terminal, a portable image viewer, a display device provided to a printer apparatus, or a digital photo frame apparatus. In addition, the present invention can be applied to a digital still camera or a digital video camera using a touch panel.

If the present invention is applied to an apparatus in which a display unit is movably or pivotably mounted to the body of the apparatus, such as a digital video camera or a portable telephone terminal, whether to assign weights to the flick operation direction determination condition can be switched according to the position of the display unit.

Figure 6A:
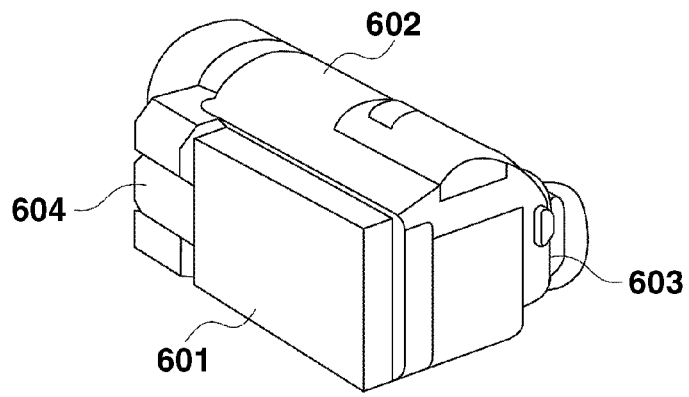
FIGS. 6A through 6C are external views of a video camera to which the present invention is applied.
Figure 6B:
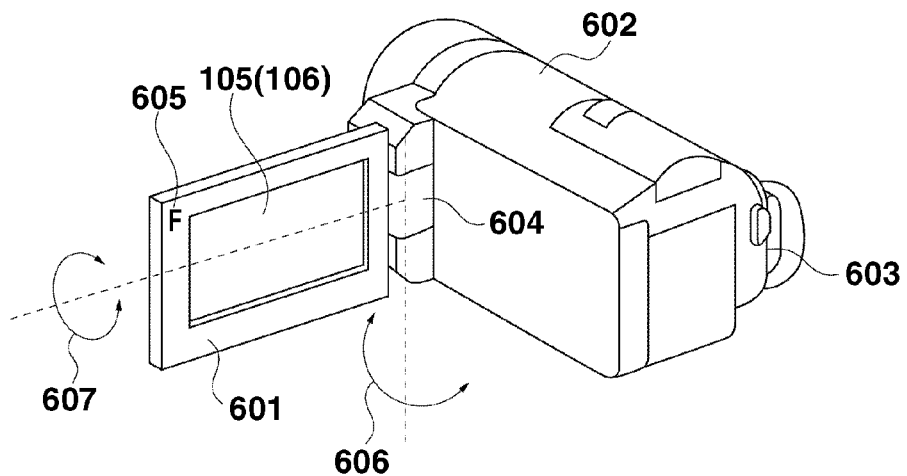
Figure 6C:
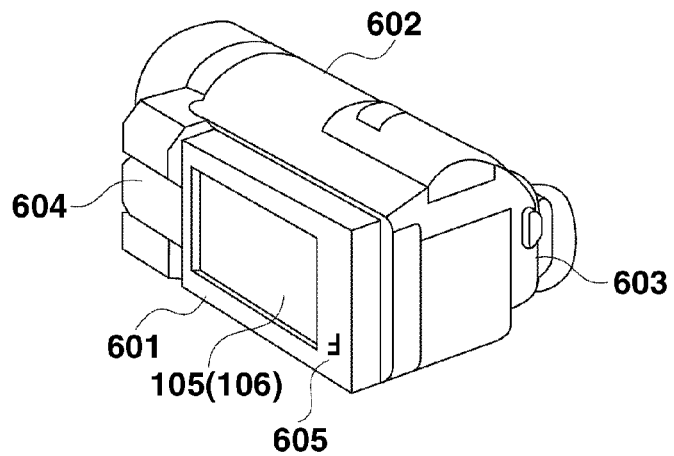

As the above-described apparatus, which is an example of the information processing apparatus 100 according to an exemplary embodiment of the present invention, FIGS. 6A through 6C illustrate an external appearance of a digital video camera. In the examples illustrated in FIGS. 6A through 6C, a display unit 601 is pivotably mounted to a camera body 602 via a connection portion 604. The camera body 602 includes an imaging unit including a lens and an image sensor and a camera holding portion 603.

In the examples illustrated in FIGS. 6B and 6C (and although not illustrated in FIG. 6A), a character "F" 605 is fixedly printed on the surface of the display unit 601 in a specific portion of the display unit 601 to simply present the orientation of the display unit 601. FIG. 6A illustrates a camera closed state, in which the display unit 601 has been kept folded. In this state, the display 105, which faces the camera body 602, is not exposed.

In the example illustrated in FIG. 6B, the display unit 601 is opened by 90 degrees in the pivoting direction 606 to open the display unit 601 from the closed state illustrated in FIG. 6A. More specifically, in the example illustrated in FIG. 6B, the display 105, which integrally includes the touch panel 106, is exposed. In this state, the user is allowed to visually recognize and operate the display 105.

In the example illustrated in FIG. 6C, the display unit 601 is pivoted by 180 degrees from the state illustrated in FIG. 6B in the direction of the pivoting direction 607, which is perpendicular to the rotation axis of the pivoting direction 606 and is further pivoted by 90 degrees in the pivoting direction 606 to fold the display unit 601. In the state illustrated in FIG. 6C also, the display 105 including the touch panel 106 integrally mounted thereto is exposed. Accordingly, the user can look at and operate the display 105.

In addition, the display unit 601 can be set at a position at which the display unit 601 is further pivoted by 90 degrees in the direction of opening the display unit 601 in the pivoting direction 606 from the state illustrated in FIG. 6B (i.e., the display unit 601 can be set at a position at which the display unit 601 is opened by 180 degrees in the opening direction of the pivoting direction 606 from the state illustrated in FIG. 6A. The above-described position is hereafter referred to as a "position D".

The CPU 101 is capable of identifying the position of the display unit 601, which is one of the above-described positions. In the example illustrated in FIG. 6B, the user holds the camera body 602 at the holding portion 603 with one hand. Accordingly, the user executes an operation on the touch panel 106 with the other hand.

In this case, the user may most likely hold the camera at the display unit 601 on the opposite side of the connection portion 604 and touch the touch panel 106 with the finger of the other hand. Accordingly, if the user thinks that he has executed a flick operation in the desired direction, it is highly likely that the locus of the movement of his finger may take an inaccurate arc-like shape as described above with reference to FIG. 7.

Accordingly, if it is determined by the CPU 101 that the display unit 601 is positioned at the position illustrated in FIG. 6B, the present exemplary embodiment executes the processing illustrated in FIG. 3 or FIG. 5. In this case, the CPU 101 assigns weight to the flick operation direction determination condition according to the direction of the immediately previous flick operation. The same applies if the display unit 601 is positioned at the position D.

On the other hand, if the display unit 601 is positioned at the position illustrated in FIG. 6C, the user may not hold the camera at the display unit 601 in a portion thereof opposite to the connection portion 604 with the hand with which the user operates the touch panel 106. Accordingly, if it is determined that the display unit 601 is positioned at the position illustrated in FIG. 6C, the CPU 101 determines that the user can execute a flick operation accurately in the desired direction. In this case, the CPU 101 can omit the weighting executed in the processing illustrated in FIG. 3 or FIG. 5. Furthermore, in this case, the CPU 101 can set a value "1" both to the variables A and B regardless of the direction of the previous flick operation.

If weights are to be assigned, the ratio of the weights to be assigned can be changed according to the position of the display unit 601. More specifically, if the display unit 601 is positioned at the position illustrated in FIG. 6B, then the CPU 101 can assign weights with a large amount of change of coefficients of the weights to the flick operation direction determination condition according to the direction of the previous flick operation. In this case, the amount of change of the coefficients is equivalent to the difference from coefficients used when no weight is assigned.

On the other hand, in this case, if the display unit 601 is positioned at the position illustrated in FIG. 6C, the CPU 101 can assign weights to the flick operation direction determination condition according to the direction of the previous flick operation. However, the amount of change of the weight coefficients is set to be smaller than that set if the display unit 601 is positioned at the position illustrated in FIG. 6B.

The example described above with reference to each of FIGS. 6A through 6C is not limited to a digital video camera. More specifically, the present invention can be applied to an apparatus including a display unit pivotably mounted to an apparatus body regardless of whether the display unit is moved by a slidable mechanism or by a pivotable mechanism. In other words, the present invention can be applied to a foldable portable telephone terminal or to a digital camera, a gaming apparatus, a portable music player, an electronic book reader, and a PDA.

In each exemplary embodiment of the present invention described above, the present invention is applied to a digital video camera. However, the present invention is not limited to this. More specifically, the present invention can be applied to any apparatus having a touch panel, such as a PC, a PDA, a portable telephone terminal, an image viewer, a display provided to a printer apparatus, a digital photo frame apparatus, a gaming apparatus, a music player, an electronic book reader, a ticket automatic vendor, or a car navigation apparatus.

The present invention can also be achieved by providing a system or an apparatus with a storage medium storing program code of software implementing the functions of the embodiments and by reading and executing the program code stored in the storage medium with a computer of the system or the apparatus (a CPU or a micro processing unit (MPU)). In this case, the program code itself, which is read from the storage medium, implements the functions of the embodiments described above, and accordingly, the storage medium storing the program code constitutes the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-295436 filed Dec. 25, 2009, which is hereby incorporated by reference herein in its entirety.

What is claimed is:

1. An information processing apparatus comprising:
an acquisition unit configured to acquire a plurality of touching positions on a locus of a touching operation for moving positions of touching a touch panel without releasing the touching on the touch panel;
a determination unit configured to determine an operation direction of the touching operation by using a determination condition based on the plurality of touching positions acquired by the acquisition unit;
a control unit configured to execute control, according to the operation direction determined by the determination unit, to perform an action predetermined in association with the operation direction;
a storage control unit configured to execute control to store, on a memory, the operation direction determined by the determination unit; and
a changing unit configured to change the determination condition based on the operation direction stored on the memory to determine an operation direction of a touching operation executed after the touching operation for which the operation direction has been determined and stored, is released,
wherein the determination unit is configured, if a touching operation for moving positions of touching the touch panel without releasing the touching on the touch panel is executed within a specific time after a previous touching operation has released, to determine the operation direction by using the determination condition changed by the changing unit, and is configured, if a touching operation for moving positions of touching the touch panel without releasing the touching on the touch panel is executed after a specific time has elapsed after a previous touching operation has released, to determine the operation direction by using the determination condition that has not been changed by the changing unit.

2. The information processing apparatus according to claim 1, wherein the changing unit is configured to change the determination condition so that a direction parallel to the stored operation direction is more likely to be determined by the determination unit as the operation direction compared to other directions.

3. The information processing apparatus according to claim 1, wherein the changing unit is configured to change the determination condition so that a direction parallel to the stored operation direction is less likely to be determined by the determination unit as the operation direction compared to other directions.

4. The information processing apparatus according to claim 1, wherein the changing unit is configured to change the determination condition so that the same direction as the stored operation direction is more likely to be determined by the determination unit as the operation direction compared to other directions.

5. The information processing apparatus according to claim 1, wherein the changing unit is configured to change the determination condition so that the same direction as the stored operation direction is less likely to be determined by the determination unit as the operation direction compared to other directions.

6. The information processing apparatus according to claim 1, wherein the changing unit is configured, if an action corresponding to an operation executed in the same direction as the stored operation direction and another action corresponding to an operation executed in a direction reverse to the stored operation direction have an increase-decrease relationship or a raising-lowering relationship for the same function, to change the determination condition so that a direction parallel to the stored operation direction is more likely to be determined by the determination unit as the operation direction compared to other directions, and
wherein the changing unit is configured, if an action corresponding to an operation executed in the same direction as the stored operation direction and another action corresponding to an operation executed in a direction reverse to the operation direction do not have an increase-decrease relationship or a raising-lowering relationship for the same function, to change the determination condition so that the same direction as the stored operation direction is more likely to be determined by the determination unit as the operation direction compared to other directions.

7. The information processing apparatus according to claim 1, wherein the changing unit is configured, if a current operation mode of the information processing apparatus is a first mode, to execute changing processing, and
wherein the changing unit is configured, if a current operation mode of the information processing apparatus is a second mode, not to execute changing processing.

8. The information processing apparatus according to claim 7, wherein the second mode includes at least one of a mode of an action in which a display portion of a display target is changed according to an operation executed in any operation direction and a mode of an action in which actions corresponding to operations in any operation direction do not have an increase-decrease relationship or a raising-lowering relationship.

9. A method for controlling an information processing apparatus configured to execute control according to an input executed via a touch panel, the method comprising:
acquiring a plurality of touching positions on a locus of a touching operation for moving positions of touching a touch panel without releasing the touching on the touch panel;
determining an operation direction of the touching operation by using a determination condition based on the plurality of acquired touching positions;
executing control, according to the determined operation direction, to perform an action predetermined in association with the operation direction;
executing control to store the determined operation direction on a memory; and
changing the determination condition based on the operation direction stored on the memory to determine an operation direction of a touching operation executed after the touching operation for which the operation direction has been determined and stored, is released,
wherein the determination step is configured, if a touching operation for moving positions of touching the touch panel without releasing the touching on the touch panel is executed within a specific time after a previous touching operation has released, to determine the operation direction by using the determination condition changed in the changing step, and is configured, if a touching operation for moving positions of touching the touch panel without releasing the touching on the touch panel is executed after a specific time has elapsed after a previous touching operation has released, to determine the operation direction by using the determination condition that has not been changed by the changing step.

10. A non-transitory computer-readable storage medium storing instructions which, when executed by a computer, cause the computer to perform the method according to claim 9.

11. An information processing apparatus comprising:
an acquisition unit configured to acquire a plurality of positions on a locus of a one-time touching operation for moving positions of touching a touch panel;
a determination unit configured to determine an operation direction corresponding to the touching operation by using a determination condition based on the plurality of positions acquired by the acquisition unit;
a control unit configured to execute control, according to the operation direction determined by the determination unit, to perform a processing corresponding to the operation direction;
a storage control unit configured to execute control to store, on a memory, the operation direction determined by the determination unit; and
a changing unit configured to change the determination condition based on the operation direction stored on the memory after the touching operation is released in a case where a following touching operation is performed within a predetermined time period since the touching operation is released.

12. The information processing apparatus according to claim 11, wherein the changing unit is configured to change the determination condition so that a direction parallel to the stored operation direction or the same direction as the stored operation direction is more likely to be determined by the determination unit as the operation direction compared to other directions.

13. The information processing apparatus according to claim 11, wherein the changing unit is configured to change the determination condition so that a direction parallel to the stored operation direction or the same direction as the stored operation direction is less likely to be determined by the determination unit as the operation direction compared to other directions.

14. The information processing apparatus according to claim 11, wherein the changing unit is configured, if an action corresponding to an operation executed in the same direction as the stored operation direction and another action corresponding to an operation executed in a direction reverse to the stored operation direction have an increase-decrease relationship or a raising-lowering relationship for the same function, to change the determination condition so that a direction parallel to the stored operation direction is more likely to be determined by the determination unit as the operation direction compared to other directions, and
wherein the changing unit is configured, if an action corresponding to an operation executed in the same direction as the stored operation direction and another action corresponding to an operation executed in a direction reverse to the operation direction do not have an increase-decrease relationship or a raising-lowering relationship for the same function, to change the determination condition so that the same direction as the stored operation direction is more likely to be determined by the determination unit as the operation direction compared to other directions.

15. The information processing apparatus according to claim 11, wherein the changing unit is configured, if a current operation mode of the information processing apparatus is a first mode, to execute changing processing, and
wherein the changing unit is configured, if a current operation mode of the information processing apparatus is a second mode, not to execute changing processing.

16. An information processing method comprising:
acquiring a plurality of positions on a locus of a one-time touching operation for moving positions of touching a touch panel;
determining an operation direction corresponding to the touching operation by using a determination condition based on the plurality of positions acquired;
executing control, according to the operation direction determined, to perform a processing corresponding to the operation direction;
storing, on a memory, the operation direction determined; and
changing the determination condition based on the operation direction stored on the memory after the touching operation is released in a case where a following touching operation is performed within a predetermined time period since the touching operation is released.

17. A non-transitory computer-readable storage medium storing instructions which, when executed by a computer, cause the computer to perform the method according to claim 16.

\* \* \* \* \*